US007500474B2

(12) United States Patent
Kano et al.

(10) Patent No.: US 7,500,474 B2
(45) **Date of Patent: *Mar. 10, 2009**

(54) LEAK DETECTING APPARATUS AND FUEL VAPOR TREATMENT APPARATUS

(75) Inventors: Masao Kano, Gamagori (JP); Shinsuke Takakura, Kariya (JP); Noriyasu Amano, Gamagori (JP)

(73) Assignees: DENSO Corporation, Kariya (JP); Nippon Soken, Inc., Nishio (JP)

( * ) Notice: Subject to any disclaimer, the term of this patent is extended or adjusted under 35 U.S.C. 154(b) by 7 days.

This patent is subject to a terminal disclaimer.

(21) Appl. No.: 11/878,314

(22) Filed: Jul. 23, 2007

(65) Prior Publication Data

US 2007/0266998 A1 Nov. 22, 2007

Related U.S. Application Data

(62) Division of application No. 11/401,464, filed on Apr. 11, 2006.

(30) Foreign Application Priority Data

Apr. 11, 2005 (JP) ............................ 2005-113689

(51) Int. Cl.
*F02M 33/02* (2006.01)
*G01M 15/00* (2006.01)

(52) U.S. Cl. ..................................... 123/520; 73/118.1

(58) Field of Classification Search ................ 123/520, 123/519, 518, 516, 198 D; 73/118.1
See application file for complete search history.

(56) References Cited

U.S. PATENT DOCUMENTS 5,054,454 A * 10/1991 Hamburg .................... 123/520
6,182,642 B1 * 2/2001 Ohkuma ..................... 123/520
6,550,315 B2 4/2003 Streib
6,722,348 B2 * 4/2004 Nagasaki et al. ............ 123/520
2004/0149016 A1 8/2004 Kano et al.
2005/0011185 A1 * 1/2005 Annoura et al. ............... 60/289
2005/0044938 A1 * 3/2005 Tsuruta et al. ............. 73/118.1

FOREIGN PATENT DOCUMENTS

JP 6-101534 4/1994

* cited by examiner

*Primary Examiner*—Thomas N Moulis
(74) *Attorney, Agent, or Firm*—Nixon & Vanderhye P.C.

(57) ABSTRACT

A leak detecting apparatus includes a canister adsorbing a fuel vapor evaporated in a fuel tank, a measure passage, a pump connected with the canister through the measure passage, and a pressure senor detecting a pressure in the measure passage. The pump depressurizes the measure passage, the canister, and the fuel tank so that a leakage of the fuel vapor is detected. When a blow-by of the fuel vapor is arisen, the pump is stopped to forcibly terminate a depressurization.

6 Claims, 15 Drawing Sheets

| | | | VALVE 22 | VALVE 52 | VALVE 102 | VALVE 106 | VALVE 112 |
|---|---|---|---|---|---|---|---|
| MAIN | LEAK | ($\alpha$) | CLOSE | CLOSE | I | OPEN | OPEN |
| | | ($\beta$) | CLOSE | OPEN | I | CLOSE | CLOSE |
| | | ($\gamma$) | CLOSE | CLOSE | I | OPEN | OPEN |
| | CONCENTRATION | ($\delta$) | CLOSE | CLOSE | I | OPEN | OPEN |
| | | ($\varepsilon$) | CLOSE | CLOSE | I | CLOSE | OPEN |
| | | ($\xi$) | CLOSE | CLOSE | II | OPEN | OPEN |
| | PURGE | ($\eta$) | OPEN | OPEN | I | OPEN | CLOSE |
| | | ($\theta$) | OPEN | CLOSE | I | OPEN | OPEN |

I : FIRST STATE
II : SECOND STATE

LEAK DETECTING APPARATUS AND FUEL VAPOR TREATMENT APPARATUS

CROSS-REFERENCE TO RELATED APPLICATION

This application is a divisional of U.S. patent application Ser. No. 11/401,464 filed Apr. 11, 2006 and which claimed priority from Japanese Patent Application No. 2005-113689 filed on Apr. 11, 2005, the disclosure of which is incorporated herein by reference.

FIELD OF THE INVENTION

The present invention relates to a leak detecting apparatus and a fuel vapor treatment apparatus provided with the leak detecting apparatus.

BACKGROUND OF THE INVENTION

It is known a fuel vapor treatment apparatus that causes a canister to temporarily adsorb fuel vapor produced in a fuel tank and introduces the fuel vapor desorbed from the canister as required into an intake passage of an internal combustion engine to purge the fuel vapor. In the fuel vapor treatment apparatus, a leak detecting apparatus is provided in order to detect a leakage of fuel vapor leaking from an evaporation system into an outside of the system.

In the leak detecting apparatus shown in JP-2004-232521A (US-2004-149016A), a pump is connected to a canister through a measure-passage. While the pump decompresses an interior of the evaporation system, a leak detection is performed based on a pressure in the measure-passage.

When the adsorbed amount of the fuel vapor is close to an upper limit of the canister adsorbing capacity, the fuel vapor is desorbed from the canister and is introduced into the pump. This is referred to as a blow-by of fuel vapor, hereinafter. When the blow-by of fuel vapor is arisen, the blow-by fuel vapor is sucked into the pump and then is discharged into outside of the pump. In the case where a discharge port of the pump is opened atmosphere, the leak detecting apparatus generates the leakage of the fuel vapor

SUMMARY OF THE INVENTION

The present invention is made in view of the above matters, and it is an object of the present invention to provide a leak detecting apparatus that can restrict the leakage of the fuel vapor, and a fuel vapor treatment apparatus provided with the leak detecting apparatus.

According to the present invention, a detecting means detects a leak of the fuel vapor from the evaporation system toward an outside thereof based on the pressure measured by a pressure measuring means while the pump depressurizes the evaporation system. The detecting means forcibly terminates the depressurization of the evaporation system when a discharge of the fuel vapor from the canister to the measure passage is detected during a leak detecting process.

BRIEF DESCRIPTION OF THE DRAWINGS

Other objects, feature and advantages of the present invention will become more apparent from the following detailed description made with reference to the accompanying drawings, in which like parts are designated by like reference numerals and in which.

DETAILED DESCRIPTION OF THE PREFERRED EMBODIMENTS

First Embodiment

Figure 1:
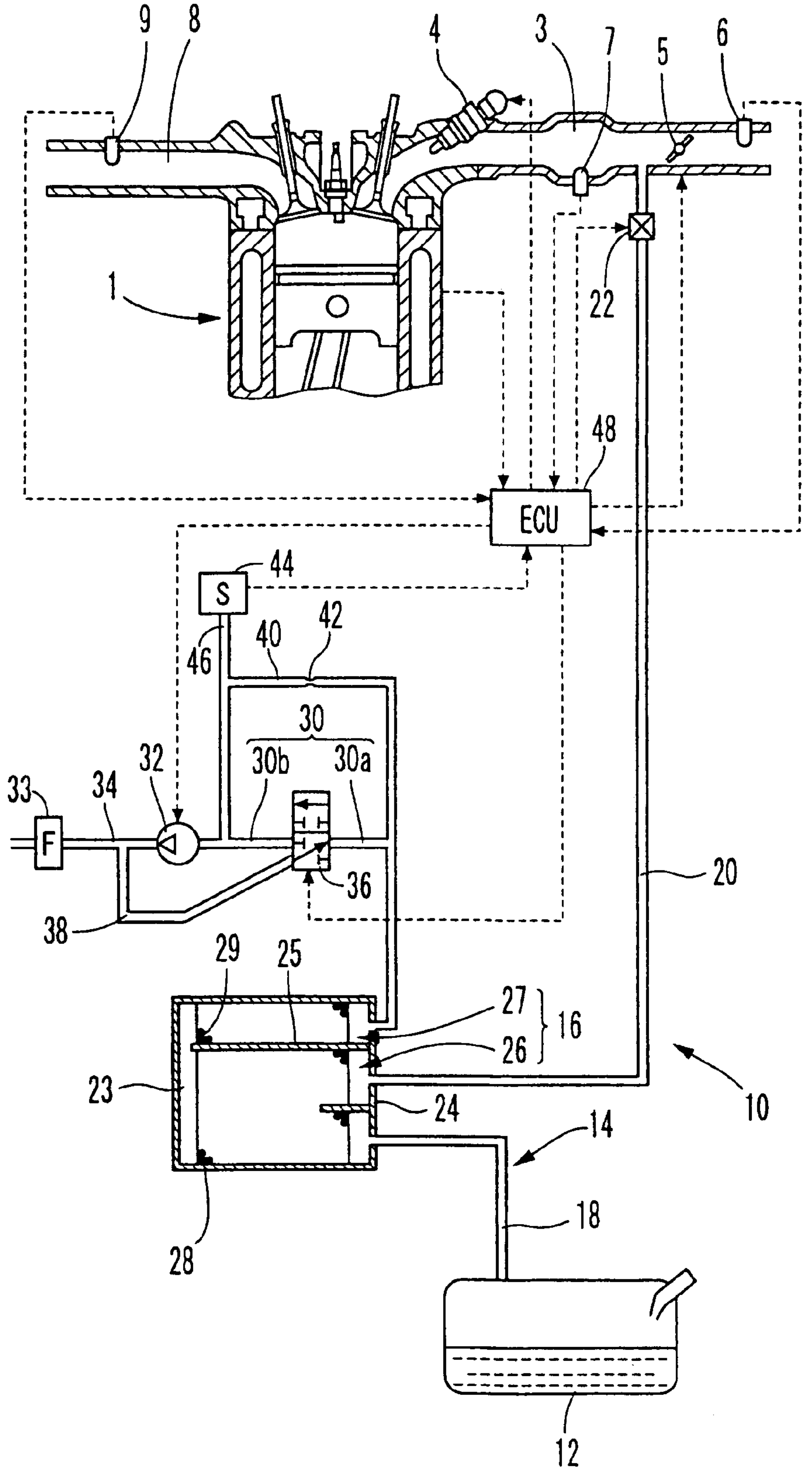
FIG. 1 is a construction diagram showing a fuel vapor treatment apparatus according to a first embodiment.

FIG. 1 shows an example in which a fuel vapor treatment apparatus 10 according to the first embodiment of the present invention is applied to the internal combustion engine 1 of a vehicle (hereinafter referred to as "engine").

The engine 1 is a gasoline engine that develops power by the use of gasoline fuel received in a fuel tank 12. The intake passage 3 of the engine 1 is provided with, for example, a fuel injection device 4 for controlling the quantity of fuel injection, a throttle device 5 for controlling the quantity of intake air, an air flow sensor 6 for detecting the quantity of intake air, an intake pressure sensor 7 for detecting an intake pressure, and the like. Moreover, the exhaust passage 8 of the engine 1 is provided with, for example, an air-fuel ratio sensor 9 for detecting an air-fuel ratio.

The fuel vapor treatment apparatus 10 processes fuel vapor produced in the fuel tank 12 and supplies the fuel vapor to the engine 1. In this embodiment, the fuel vapor treatment apparatus 10 functions as a leak detecting apparatus that detects a leakage of the fuel vapor leaking from the evaporation system 14 into outside thereof.

The evaporation system 14 includes a fuel tank 12, a canister 16, an introduction passage 18, a purge passage 20, and a purge controlling valve 22.

In the canister 16, a case 24 is partitioned by a partition wall 25 to form two adsorption parts 26, 27. The respective adsorption parts 26, 27 are packed with adsorptive agents 28, 29 made of activated carbon or the like. The main adsorption part 26 is provided with the introduction passage 18 connecting with the inside of the fuel tank 12. Hence, fuel vapor produced in the fuel tank 12 flows into the main adsorption part 26 through the introduction passage 18 and is adsorbed by the adsorptive agent 28 in the main adsorption part 26 in such a way as to be desorbed. The main adsorption part 26 is further provided with a purge passage 20 connecting with the intake passage 3. Here, a purge-controlling valve 22 made of an electromagnetically driven two-way valve is provided at the end of the intake passage side of the purge passage 20. The purge-controlling valve 22 is opened or closed to control the connection between the purge passage 20 and the intake passage 3. With this, in a state where the purge-controlling valve 22 is opened, negative pressure developed on the downstream side of the throttle device 5 of the intake passage 3 is applied to the main adsorption part 26 through the purge passage 20. Therefore, when the negative pressure is applied to the main adsorption part 26, fuel vapor is desorbed from the adsorptive agent 28 in the main adsorption part 26 and the desorbed fuel vapor is mixed with air and is introduced into the purge passage 20, whereby fuel vapor in the air-fuel mixture is purged to the intake passage 3. In this regard, the fuel vapor purged into the intake passage 3 through the purge passage 20 is combusted in the engine 1 along with fuel injected from the fuel injection device 4.

The main adsorption part 26 connects with a subordinate adsorption part 27 via a space 23 at the inside bottom of the case 24. The fuel vapor desorbed from one of the adsorption parts 26, 27 remains once in the space 23 and then is adsorbed by the other adsorption part.

The pump 32 is constructed of, for example, an electrically driven vane pump. The suction port of the pump 32 connects with one end of the measure passage 30, and the discharge port of the pump 32 connects with a first atmosphere passage 34 open to the atmosphere via a filter 33. The pump 32 is so constructed as to reduce pressure in the measure passage 30 and discharges gas sucked from the measure passage 30 to the atmosphere through the first atmosphere passage 34.

A passage-changing valve 36 is constructed of an electromagnetically driven three-way valve that performs a two-position action. The passage-changing valve 36 is provided in the measure passage 30, and is connected with a second atmosphere passage 38 which is branched from the first atmosphere passage 34. The passage-changing valve 36 switches a passage connecting with a first passage 30*a* between a second passage 30*b* and the second atmosphere passage 38. In a first state of the passage-changing valve 36 where the first passage 30*a* is connected with the second atmosphere passage 38, the first passage 30*a* is opened to the atmosphere through the first and the second atmosphere passage 34, 38. In a second state where the first passage 30*a* is connected with the second passage 30*b*, the negative pressure produced by the pump 32 is introduced into the evaporation system 14 through the first and the second passage 30*a*, 30*b*. At this time, when the subordinate adsorption part 27 is almost saturated, the fuel vapor is desorbed and may be blown toward the measure passage 30.

In the first state of the passage-changing valve 36, the measure passage 30 is closed between the canister 16 and the pump 32. In the second state, the measure passage 30 is opened. That is, the passage-changing valve 36 opens/closes the measure passage 30.

A restrictor passage 40 connects between the first passage 30*a* and the second passage 30*b* by bypassing the measure passage 30. When the passage-switching valve 36 is positioned in the first state, the restrictor passage 40 is opened to atmosphere. Furthermore, when the pump 32 depressurizes the second passage 30*b* in this state, the restrictor passage 40 is also depressurized.

The restrictor passage 40 is provided with a restrictor 42 which restricts a flow passage area of the passage 40. The inner diameter and the cross sectional area of the restrictor 42 are smaller than predetermined values which are based on regulations.

A pressure sensor 44 connects with a pressure introducing passage 46 branched from the restrictor passage 40 between the restrictor 42 and the second passage 30*b*. With this, the pressure sensor 44 detects a pressure that is received through the pressure introducing passage 46. Therefore, a pressure detected by the pressure sensor 44 in the first state of the passage-changing valve 36 is substantially equal to the pressure in the restrictor passage 40. In the second state of the valve 36, the detected pressure is substantially equal to the pressure in the measure passage 30 and the evaporation system 14. The pressure sensor 44 can be an absolute pressure sensor or a differential pressure senor relative to an atmospheric pressure.

An electronic control unit (ECU) 48 is mainly constructed of a microcomputer having a CPU and a memory and is electrically connected to the purge controlling valve 22, the pump 32, the passage-changing valve 36, the sensor 44, and the engine 1. The ECU 48 controls the respective operations of the pump 32 and the valves 22 and 36 on the basis of the detection results of the respective sensors 44, 6, 7, 9, the temperature of cooling water of the engine 1, the temperature of working oil of the vehicle, the number of revolutions of the engine 1, the accelerator position of the vehicle, the ON/OFF state of an ignition switch, and the like. Moreover, the ECU 48 of this embodiment has also the functions of controlling the engine 1, such as the quantity of fuel injection of the fuel injection device 4, the opening of the throttle device 5, the ignition timing of the engine 1, and the like.

Figure 2:
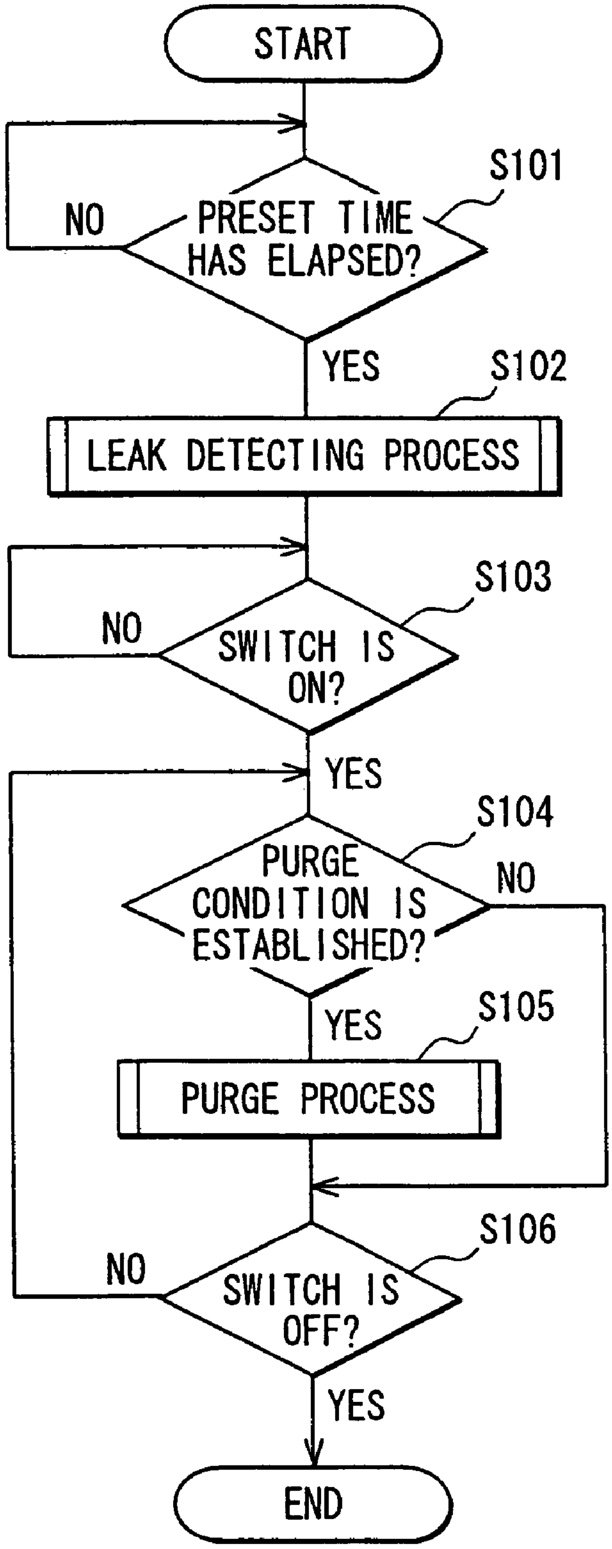
FIG. 2 is a flow chart for explaining a main operation of the fuel vapor treatment apparatus according to the first embodiment.

Next, the flow of a main operation characteristic of the fuel vapor treatment apparatus 10 will be described on the basis of FIG. 2. The main operation is started when an ignition switch is turned OFF to stop the engine 1.

First, in step S101, the ECU 48 determines whether a preset time has elapsed since the ignition switch is turned OFF. When the answer is YES in step S101, the procedure proceeds to step S102 to conduct the leak detecting process. After the leak detecting process is completed in step S102, the procedure proceeds to step S103. The preset time in step S101 is determined based on a condition in the fuel tank and a required accuracy of a leak detecting, and is stored in a memory of the ECU 48.

In step S103, the ECU 48 determines whether the ignition switch is turned ON. When the answer is YES in step S103, the procedure proceeds to step S104. In step S104, the ECU 48 determines whether a purge condition is established. When the engine coolant temperature, the working oil temperature of the vehicle, the engine speed, and physical quantities representing a vehicle condition are in a predetermined range, the purge condition is established. For example, when the engine coolant temperature exceeds a predetermined value so that the warm-up of the engine is completed, the purge condition is established and is stored in the memory of the ECU 48.

When the answer is YES in step S104, the procedure proceeds to step S105 in which the purge process is performed. The purge controlling valve 22 is opened and the passage-changing valve 36 is switched to the first state, so that the negative pressure in the intake passage 3 is introduced into the canister 16. The fuel vapor is desorbed from the main adsorption part 26 toward the purge passage 20 to be purged into the intake passage 3. When the purge stop condition is established, the procedure proceeds to step S106. The pure stop condition has a meaning that the engine speed, the accelerator position, physical quantities representing the vehicle condition are in a predetermined range which is different from the range of the purge condition. For example, when the accelerator position becomes lower than a predetermined value to decrease the vehicle speed, the purge stop condition is established and is stored in the memory.

When the answer is No in step S104, the procedure proceeds to step S106. In step S106, the ECU determines whether the ignition switch is turned OFF. When the answer is NO, the procedure returns to step S104. When the answer is YES, the procedure ends.

Figure 3:
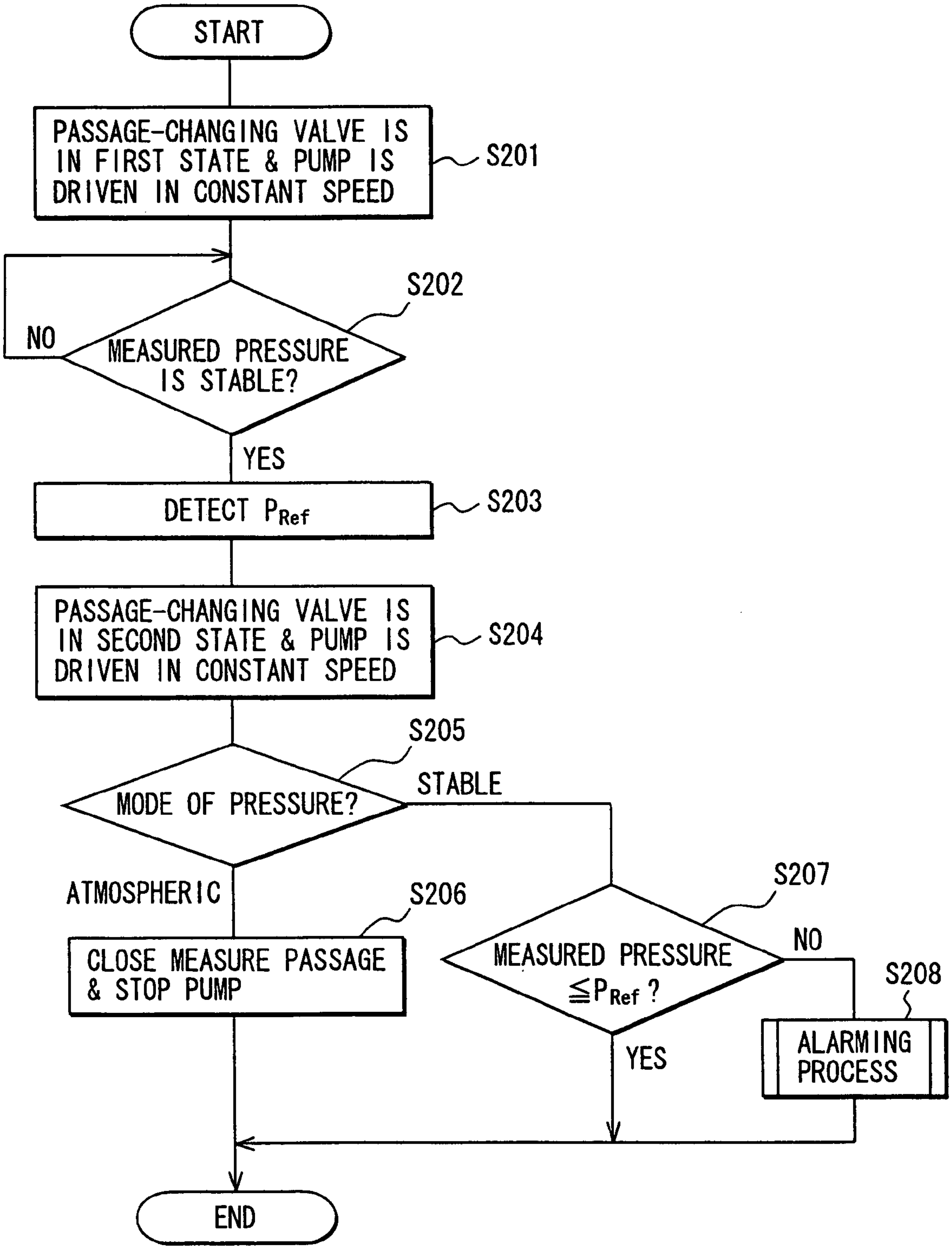
FIG. 3 is a flow chart for explaining a leak detecting process in FIG. 2.

Referring to FIG. 3, the leak detecting process in step S102 is described in detail hereinafter. During the leak detecting process, the purge controlling valve 22 is always closed.

Figure 4:
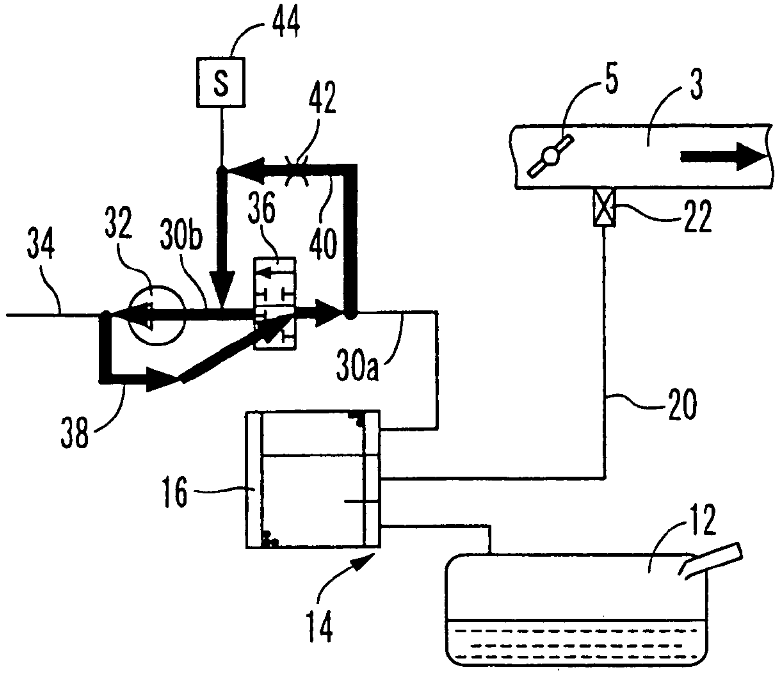
FIG. 4 is a schematic construction diagram for explaining the leak detecting process.
Figure 5:
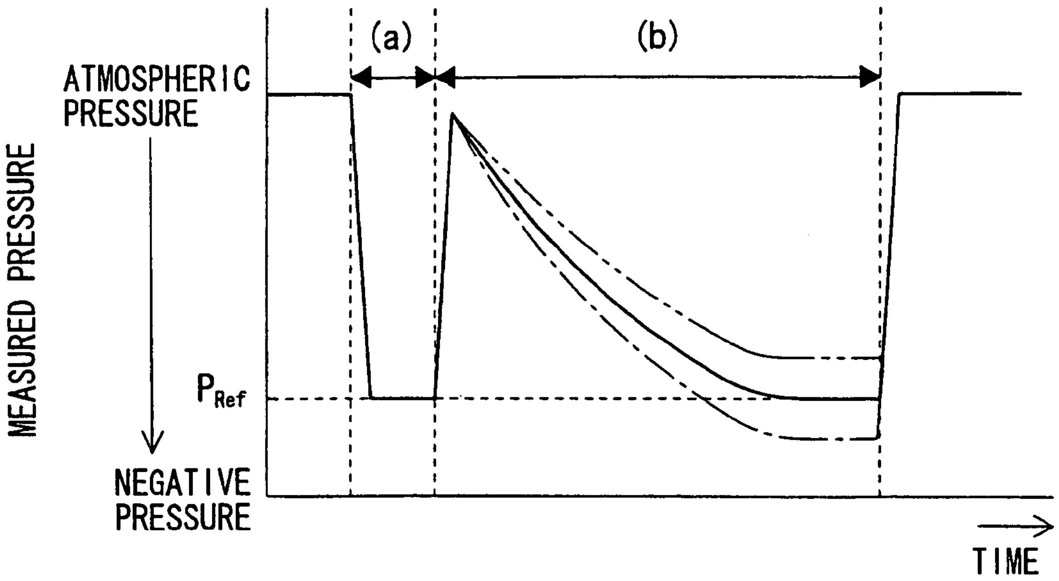
FIG. 5 is a characteristic diagram for explaining the leak detecting process.

In step S210, the passage-changing valve 36 is positioned in the first state, and the pump 32 is driven in a constant speed. As shown in FIG. 4, the air flowing into the restrictor passage 40 is restricted by the restrictor 42 and is introduced into the pump 32, so that the pressure measured by the sensor is decreased as shown in an area (a) of FIG. 5. When the measured pressure reaches to a predetermined negative pressure $P_{Ref}$, the measured pressure is stable around the pressure $P_{Ref}$.

In step S202, the ECU 48 determines whether the measured pressure becomes stable. When the answer is YES in step S202, the procedure proceeds to step S203 in which the measure pressure is stored in memory of the ECU 48 as the reference pressure $P_{Ref}$.

Figure 6:
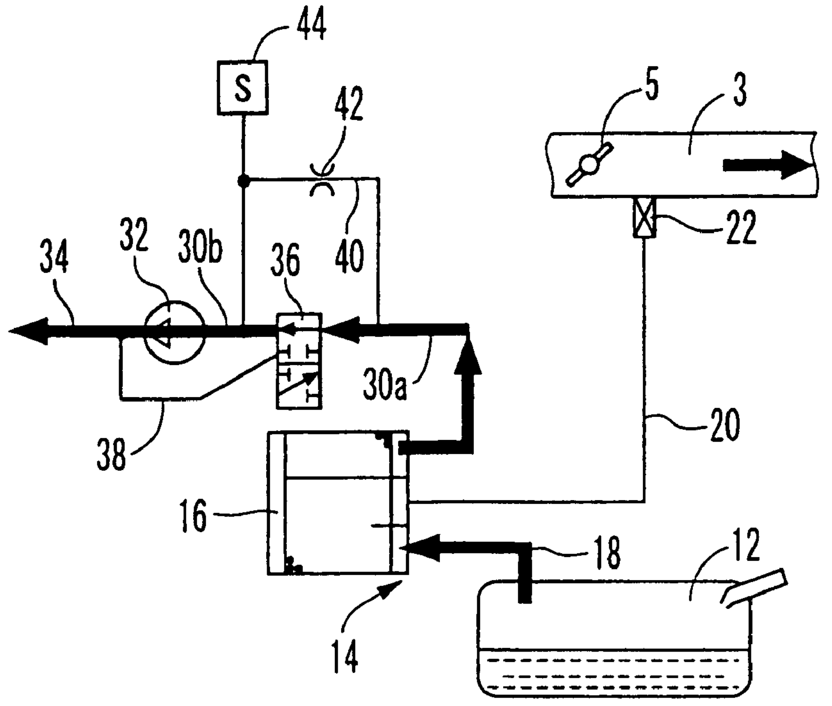
FIG. 6 is a schematic construction diagram for explaining the leak detecting process.

In step S204, the passage-changing valve 36 is positioned in the second state, and the pump 32 is driven in the constant speed. As the result, since the pressure in the measure passage 30 becomes substantially equal to the pressure in the evaporation system right after the passage-changing valve 36 is switched, the measured pressure varies toward the atmospheric pressure as shown in an area (b) of FIG. 5. After that, the pressures in the measure passage 30 and in the evaporation system 14 are decreased as shown in FIG. 6, the measured pressure is decreased as shown in the area (b) of FIG. 5.

Here, the variation of the measured pressure will be described in a case that the blow-by of the fuel vapor from the canister 16 to the measure passage 30 is not arisen.

Figure 7:
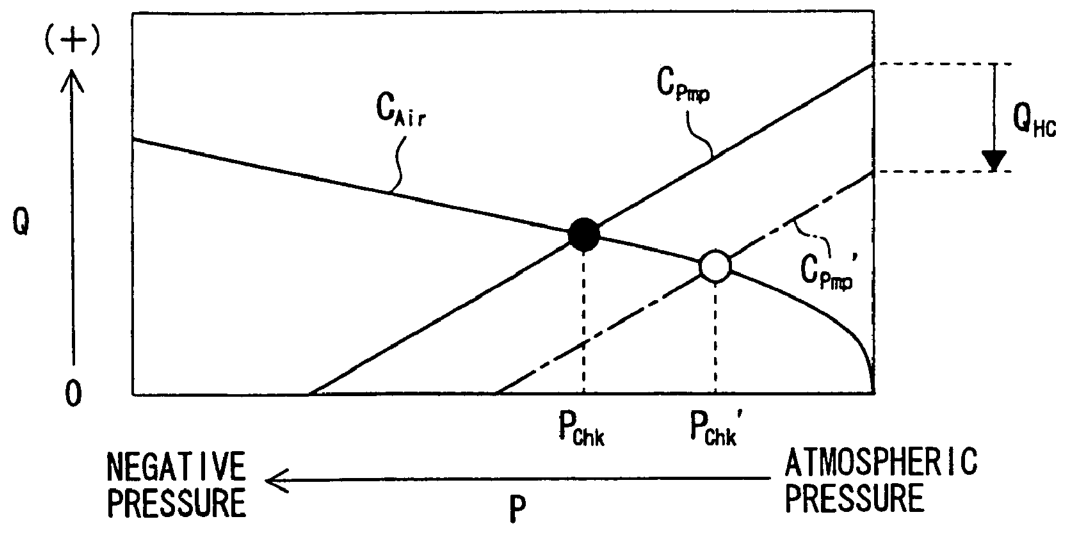
FIG. 7 is a characteristic diagram for explaining the leak detecting process.

When the no blow-by of the fuel vapor is arisen, a flowrate $Q_{Air}$ of air flowing into the evaporation system 14 through a leak hole and a flowrate $Q_{Pmp}$ of air discharged from the pump are expressed by the following equations (1) and (2). When the pressure in the evaporation system 14 is stable, the flowrate $Q_{Air}$ and the flowrate $Q_{Pmp}$ agree with each other. Hence, as shown in FIG. 7, the measured pressure in the measure passage 30 and the evaporation system 14 corresponds to a pressure $P_{Chk}$ in which the characteristic curves $C_{Air}$ and $C_{Pmp}$ of the flowrates $Q_{Air}$ and $Q_{Pmp}$ are crossed each other. In the following equation (1), "α" represents a flowrate coefficient of air, "$\rho_{Air}$" represents a density of air, and "A" represents an area of the leak hole. In the equation (2), K1 and K2 are specific constant numbers of the pump 32.

$$Q_{Air}=\alpha\cdot A\cdot(2\cdot P/\rho_{Air})^{1/2} \quad (1)$$

$$Q_{Pmp}=K1\cdot P+K2 \quad (2)$$

In this embodiment, it can be assumed that the reference pressure $P_{Ref}$ obtained in step S201 and S202 corresponds to the pressure $P_{Chk}$ in a case that a leak hole having the same area of the restrictor 42 exists. When the area of the leak hole is smaller than that of the restrictor 42, the measured pressure varies to the reference pressure $P_{Ref}$ or a lower value as shown by a solid line or dashed line in the area (b) of FIG. 5. On the other hand, when the area of the leak hole is larger than that of the restrictor 42, the measured pressure becomes stable before the pressure reaches the reference pressure $P_{Ref}$ as shown by double-dashed line in the area (b) of FIG. 5.

A variation of the measured pressure will be explained hereinafter in a case that the blow-by of the fuel vapor from the canister 16 to the measure passage 30 is arisen.

When the blow-by is arisen, the sum of the flowrate $Q_{Air}$ and a flowrate $Q_{HC}$ of fuel vapor blown from the canister 16 agrees with the flowrate $Q_{Pmp}$. Hence, the measured pressure in the measure passage 30 and the evaporation system 14 corresponds to a pressure $P_{Chk}'$ in which a hypothetical curve $C_{Pmp}'$ and the characteristic curve $C_{Air}$ are crossed each other. The hypothetical curve $C_{Pmp}'$ is a curve in which $Q_{HC}$ is subtracted from the characteristic curve $C_{Pmp}$. Thus, as shown in an area (b) of FIG. 8, a changing direction of the measured pressure is changed from the negative pressure toward the atmospheric pressure.

In step S205, the ECU watches a changing mode of the measured pressure. When the measured pressure tends to vary toward the atmospheric pressure, it is determined that the blow-by of the fuel vapor from the canister 16 is detected and the procedure proceeds to step S206. In step S206, the passage-changing valve 36 is switched to the first state to close the measure passage 30 and stop the pump 32. The depressurization of the measure passage 30 and the evaporation system 14 is forcibly terminated to end the leak detecting process.

When the measured pressure tends to be stable in step S205, the procedure proceeds to step S207 in which the stable measured pressure is compared with the reference pressure $P_{Ref}$. When the measured pressure is lower than or equal to the reference pressure $P_{Ref}$, the computer determines that the system is normal with respect to the leakage to end the leak detecting process. When the measured pressure is larger than the reference pressure $P_{Ref}$, the computer determines that the system has malfunction with respect to the leakage, and the procedure proceeds to step S208 in which an alarming process is performed. The malfunction is notified to the user of the vehicle.

According to the first embodiment, when the blow-by of the fuel vapor is detected, the passage-changing valve 36 closes the measure passage 30 and the pump 32 is stopped. Thereby, the depressurization in the measure passage 30 and the evaporation system 14 is forcibly terminated so that the blow-by of the fuel vapor is restricted and the fuel vapor does not flow into the pump 32. It is restricted that the fuel vapor is blown by the canister 16 and is discharged into the atmosphere through the pump 32 during the leak detecting process.

Second Embodiment

Figure 9:
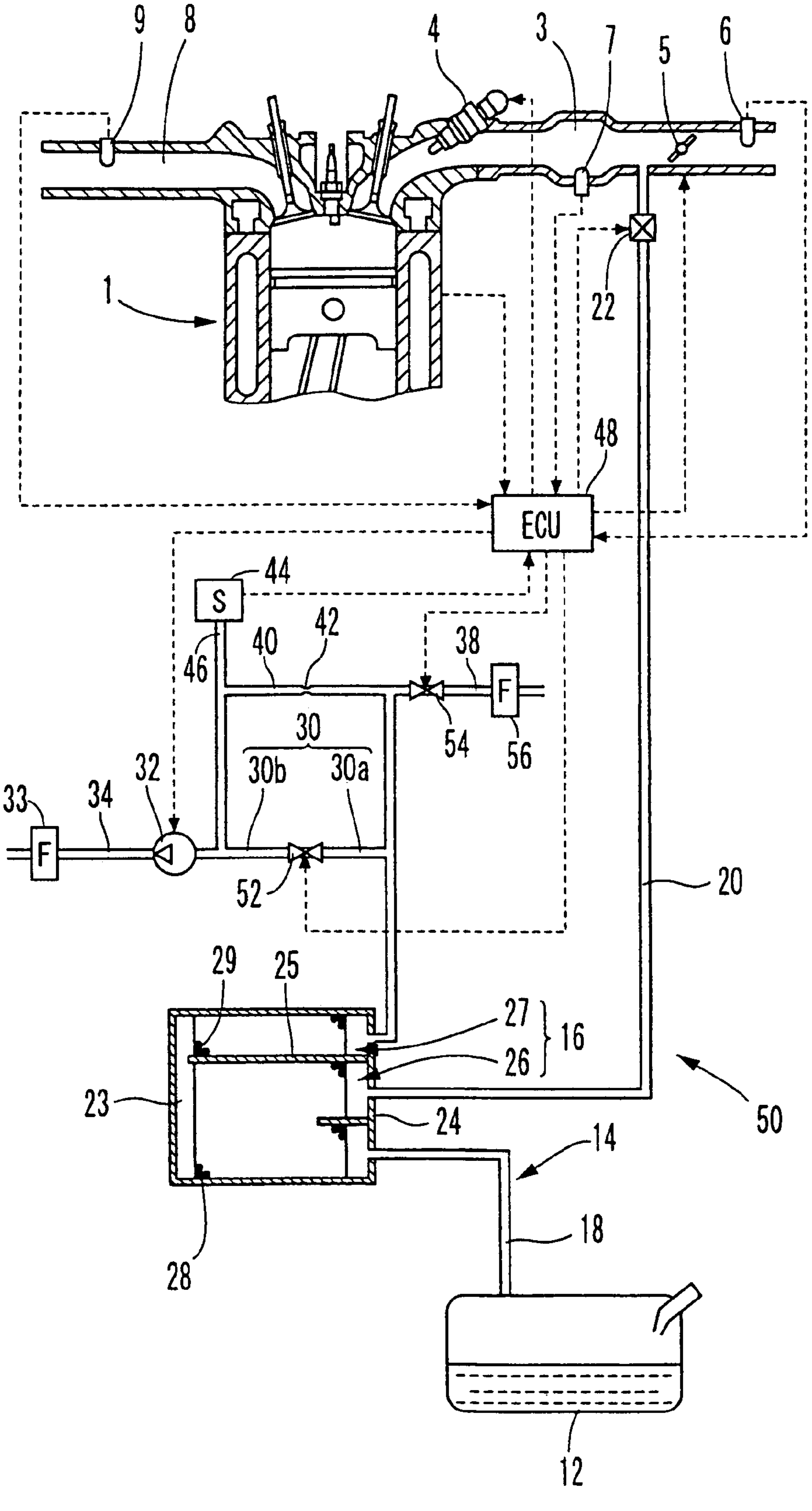
FIG. 9 is a construction diagram showing a fuel vapor treatment apparatus according to a second embodiment.

FIG. 9 shows a second embodiment in which the same parts and components as those in the first embodiment are indicated with the same reference numeral and the same descriptions will not be reiterated.

A fuel vapor treatment apparatus 50 includes passage-opening/closing valves 52, 54 which are two-way valves. The second atmosphere passage 38 is connected with the restrictor passage 40 at a middle portion thereof, and is opened to the atmosphere through a filter 56.

The first passage-opening/closing valve 52 is provided in the measure passage 30 between the first passage 30*a* and the second passage 30*b*. When the first passage-opening/closing valve 52 is open, the pump 32 depressurizes the evaporation system 14 through the measure passage 30. The second passage-opening/closing valve 54 is provided in the second atmosphere passage 38. When the second passage-opening/closing valve 543 is open, the restrictor passage 40 is opened to the atmosphere. These valves 52, 54 are electrically connected with the ECU 48.

In the purge process (step S105) and steps S201, S206, the first passage-opening/closing valve 52 is closed, and the second passage-opening/closing valve 54 is opened. In step S204, the first passage-opening/closing valve 52 is opened, and the second passage-opening/closing valve 54 is closed. The second embodiment achieves the same effect as the first embodiment.

Third Embodiment

Figure 10:
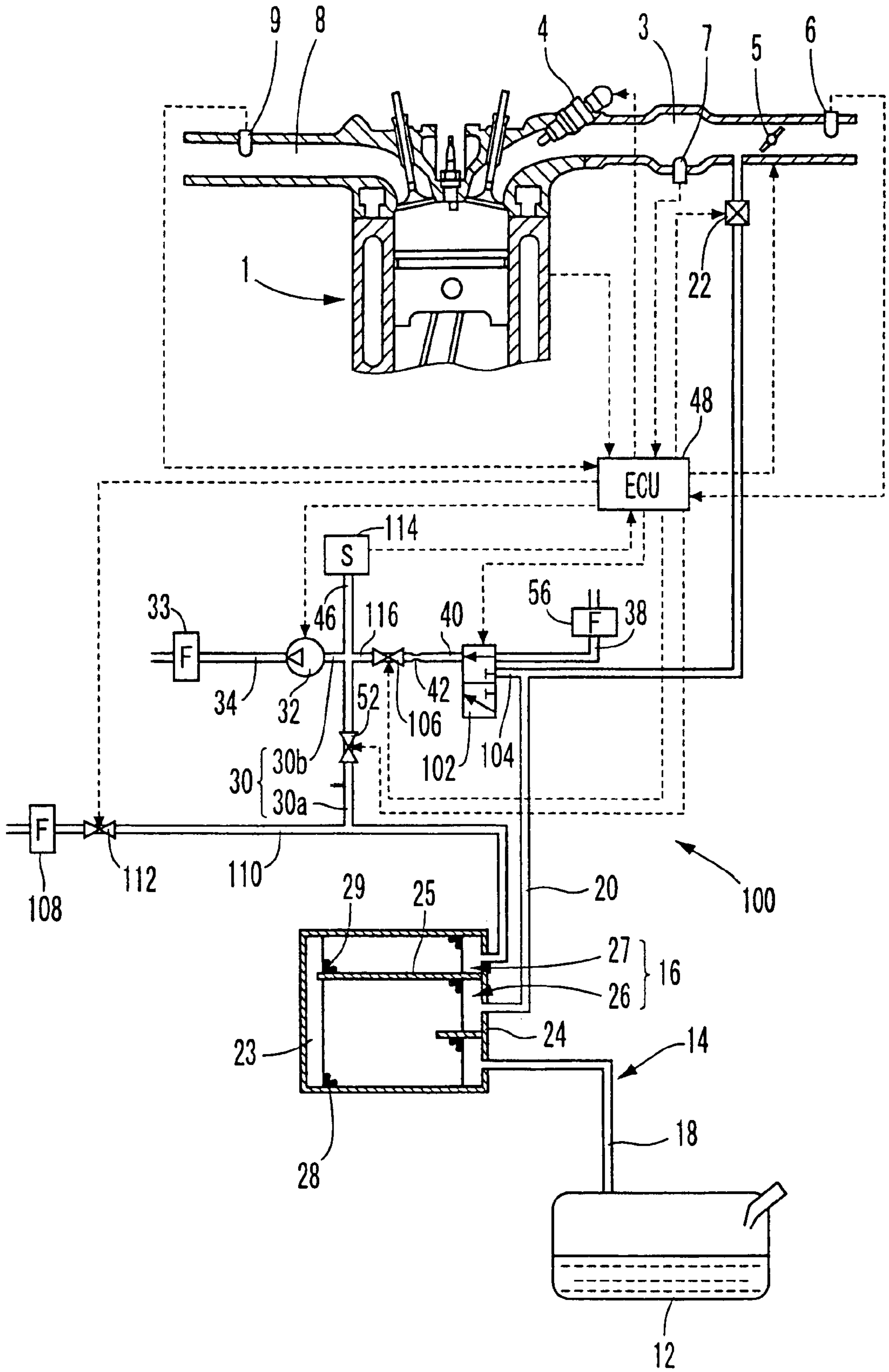
FIG. 10 is a construction diagram showing a fuel vapor treatment apparatus according to a third embodiment.

FIG. 10 shows a third embodiment in which the same parts and components as those in the first and second embodiments are indicated with the same reference numeral and the same descriptions will not be reiterated.

In a fuel vapor treatment apparatus 100, the restrictor passage 40 and the second atmosphere passage 38 are connected with a three-way switching valve 102, which is connected with a branch passage 104 of the purge passage 20. The switching valve 102 switches a passage connecting to the restrictor passage 40 between the second atmosphere passage 38 and the branch passage 104. When the switching valve 102 is positioned in a first state in which the second atmosphere passage 38 communicates with the restrictor passage 40, the restrictor passage 40 is opened to the atmosphere through the second atmosphere passage 38. When the switching valve 102 is positioned in a second state in which the branch passage 104 communicates with the restrictor passage 40, the air-fuel mixture including the fuel vapor in the purge passage 20 flows into the restrictor passage 40 through the branch passage 104.

When the switching valve 102 is positioned in the second state, the restrictor passage 40 communicates with the branch passage 104. When the switching valve 102 is positioned in the first state, the communication between the restrictor passage 40 and the branch passage 104 is shut off.

A two-way opening/closing control valve 106 is provided between a restrictor 42 and a branch point of the pressure introducing passage 46. The opening/closing control valve 106 opens and closes the restrictor passage 40. When the opening/closing control valve 106 is open, the pump 32 depressurizes the passage 38 and the branch passage 104 through the second passage 30*b* and the restrictor passage 40. When the opening/closing valve 106 closes, the pump 32 depressurizes only the second passage 116.

The fuel vapor treatment apparatus 100 has a canister close valve 112 provided in a third atmosphere passage 110. The third atmosphere passage 110 is branched from the first passage 30*a* of the measure passage 30 and is opened to the atmosphere through a filter 108. Hence, when the canister close valve 112 is open, the canister 16 is opened to the atmosphere through the third atmosphere passage 110 and the first passage 30*a*.

A pressure sensor 114 detects a differential pressure between a pressure in the pressure introducing passage 46 and an atmospheric pressure. Thus, in a condition that the passage-opening/closing valve 52 is open and the opening/closing control valve 106 are closed, the pressure measured by the pressure sensor 114 is substantially equal to a differential pressure between the atmospheric pressure and a pressure in the measure passage 30 and evaporation system 14. Besides, in a condition that the passage-opening/closing valve 52 is closed and the opening/closing control valve 106 is open, the pressure measured by the pressure sensor 114 is substantially equal to a differential pressure between the atmospheric pressure and a pressure in the second passage 116, that is, a differential pressure between both ends of the restrictor 42. Furthermore, in a condition that the passage-opening/closing valve 52 and the opening/closing control valve 106 are closed, the measured pressure is substantially equal to a shut-off pressure of the pump 32 which depressurizes the second passage 30*b* of the measure passage 30 and the second passage 116 of the restrictor passage 40.

Figure 11:
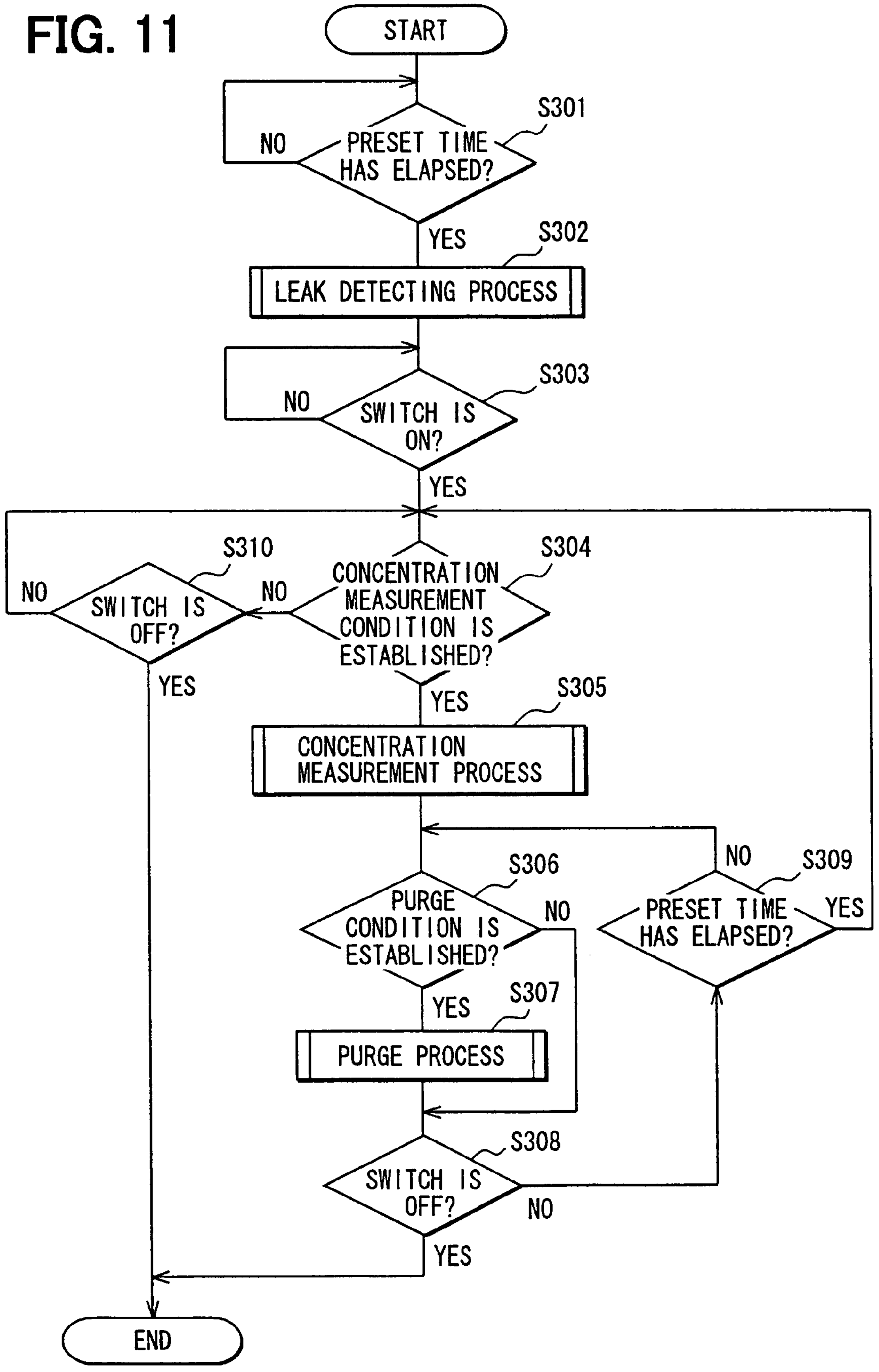
FIG. 11 is a flow chart for explaining a main operation of the fuel vapor treatment apparatus according to the third embodiment.

Referring to FIG. 11, the flow of a main operation characteristic of the fuel vapor treatment apparatus 100 will be described. The main operation is started when an ignition switch is turned OFF to stop the engine 1.

Procedures in step S301 to step S303 are performed as well as procedures in step S101 to step S303 in the first embodiment. In step S302, a leak detecting process, which is different from the first embodiment, is performed.

In step S304, the ECU 48 determines whether a concentration measurement condition is established. When a temperature of engine coolant, a temperature of a working fluid, an engine speed, and a physical quantities representing a vehicle condition are within a predetermined range which is different from the purge condition. Such a concentration measurement condition is set in such a manner as to be established right after the engine 1 starts, and is stored in the memory of the ECU 48.

When the answer is YES is step S304, the procedure proceeds to step S305 in which a concentration measuring process is performed. After the concentration measuring process in step S305, the procedures in step S306 and step S307 are performed as well as step S104 and step S105 in the first embodiment. The purge process in step S307 is different from the purge process in the first embodiment.

In step S308, the ECU 48 determines whether the ignition switch is turned OFF. When the answer is NO, the procedure proceeds to step S309, and when the answer is NO, the procedure ends.

In step S309, the ECU 48 determines whether a preset time has passed since the concentration measuring process is finished. When the answer is YES, the procedure goes back to step S304. When the answer is NO, the procedure goes back to step S306. The preset time which is a reference in step S309 is determined based on a variation of fuel vapor concentration and a required accuracy of the concentration measurement.

When the answer is NO in step S304, the procedure proceeds to step S310 in which the ECU 48 determines whether the ignition switch is turned OFF. When the answer is NO in step S310, the procedure goes back to step S304. When the answer is YES, the procedure ends.

Figure 12:
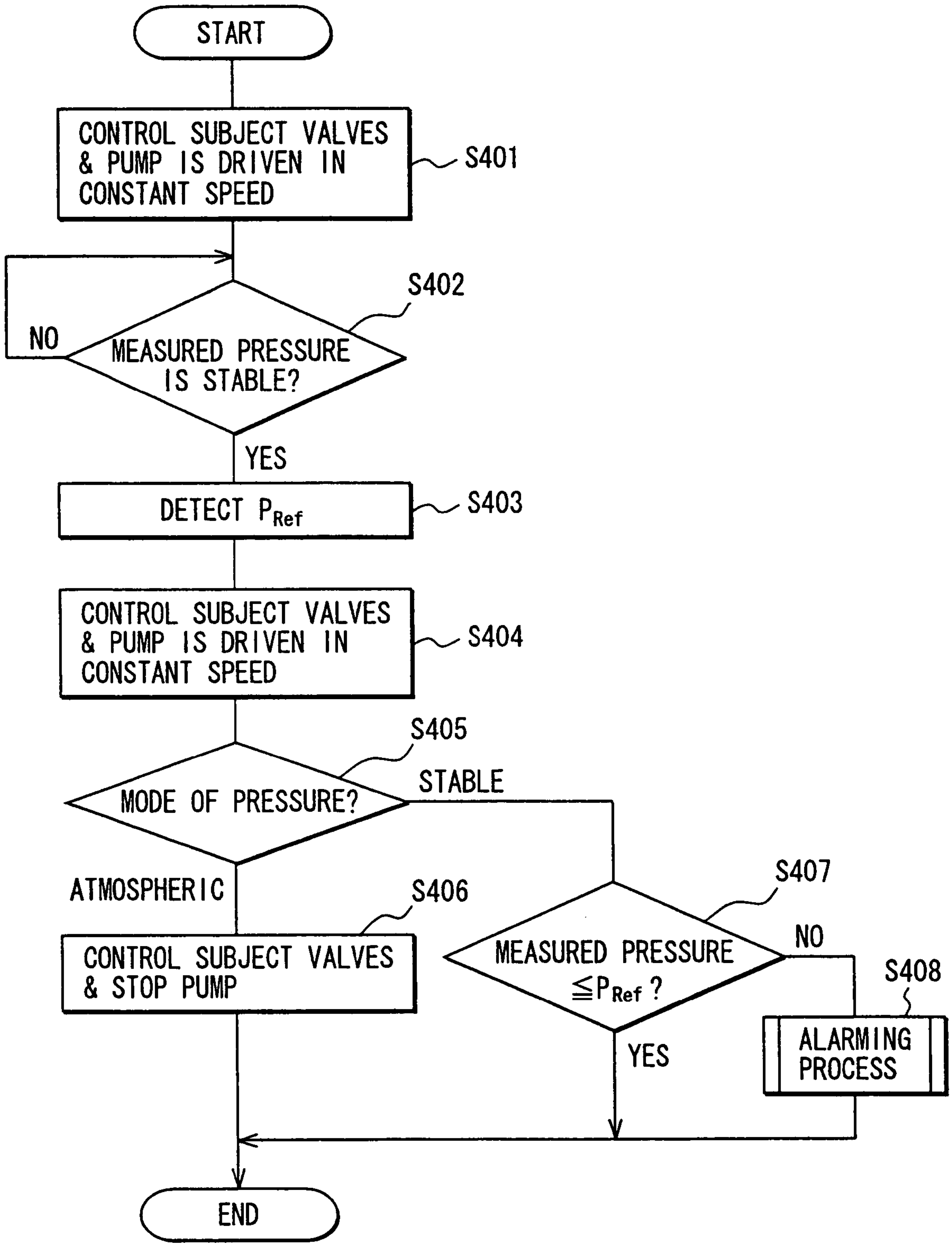
FIG. 12 is a flow chart for explaining a leak detecting process in FIG. 11.

Referring to FIG. 12, the flow of leak detecting process is described hereinafter. During the leak detecting process, the purge controlling valve 22 is closed as shown in (α) to (γ) of FIG. 13.

Figures 8, 13:
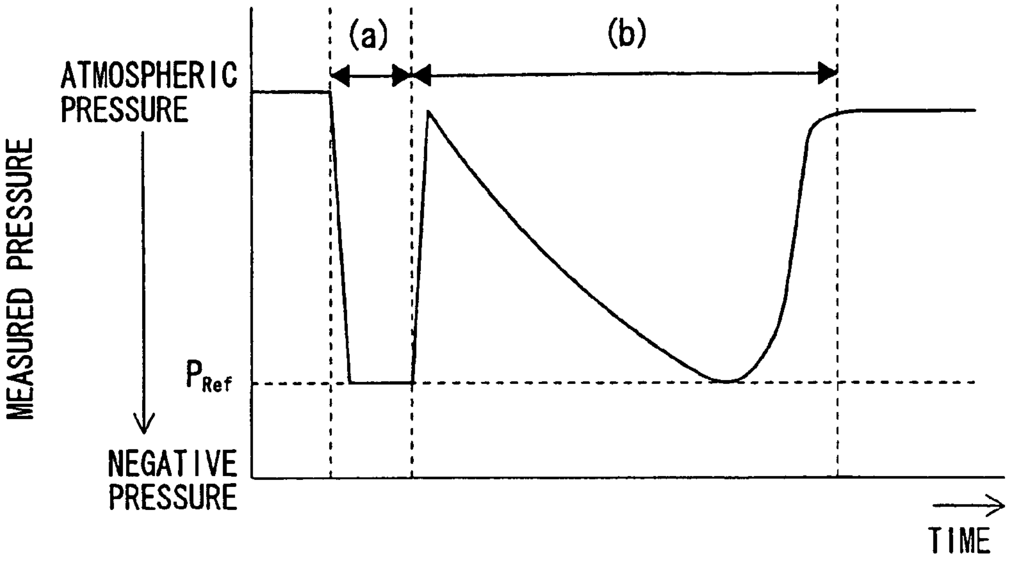
FIG. 8 is a characteristic diagram for explaining the leak detecting process.
FIG. 13 is a chart for explaining the leak detecting process, a concentration measurement process, and a purge process.
Figure 14:
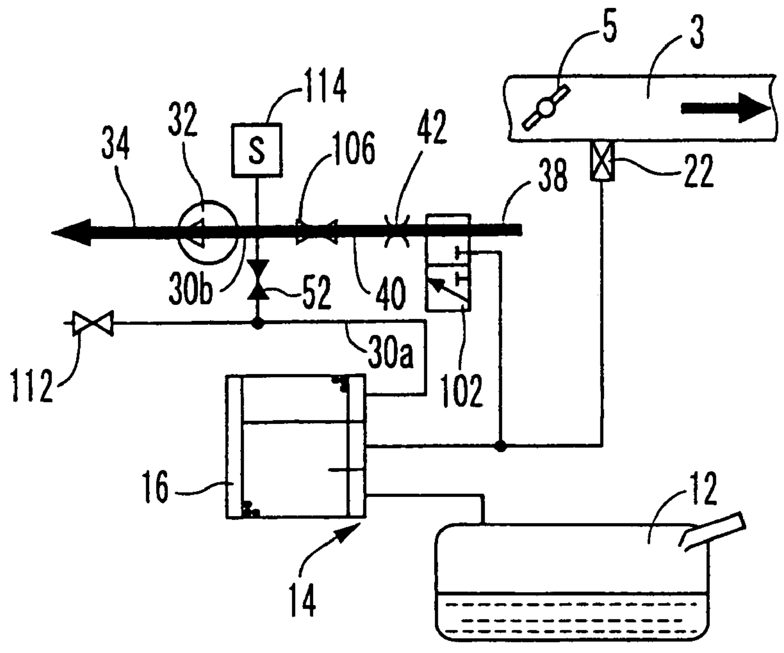
FIG. 14 is a schematic construction diagram for explaining the leak detecting process and the concentration measurement process.

In step S401, control subject valves 52, 102, 106, and 112 are switched into positions shown in (α) of FIG. 13. As shown in FIG. 14, since the air is restricted by the restrictor 42 and is introduced into the pump, the measured pressure varies to a predetermined pressure $P_{Ref}$.

The procedures in step S402 and S403 are the same as the procedures in step S202 and S203.

Figure 15:
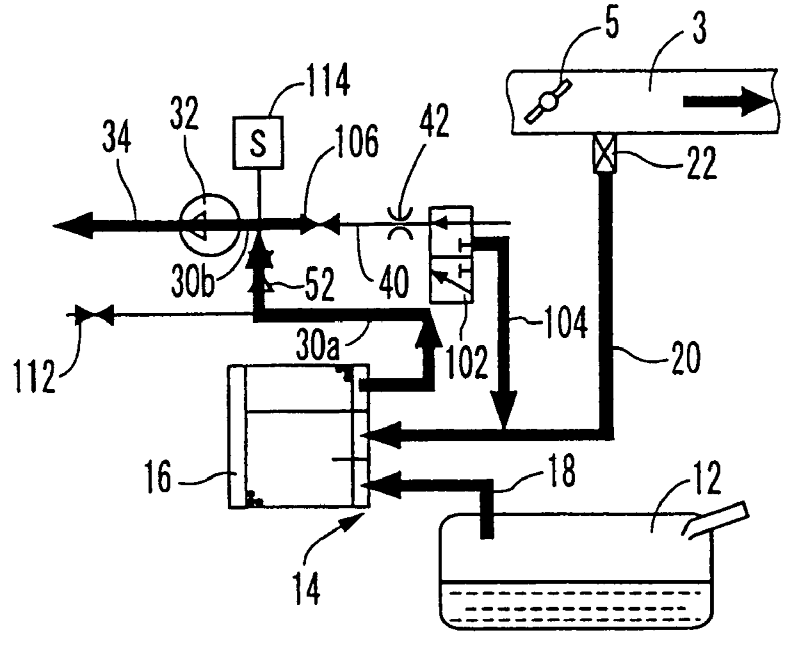
FIG. 15 is a schematic construction diagram for explaining the leak detecting process.

In step S404, the control subject valves 52, 102, 106, and 112 are switched into positions shown in (β) of FIG. 13. As shown in FIG. 15, since the depressurization of the measure passage 30 and the evaporation system 14 is started, the measured pressure is varied toward the atmospheric pressure once, and then is varied toward negative pressure. The measured pressure varies as well as the first embodiment.

The procedures in step S404 to step S408 are the same as the procedures in step S205 to step S208. In step S406, the control subject valves 52, 102, 106 and 112 are switched into positions shown in (γ) of FIG. 13. Since the pump 31 is stopped and the measure passage 30 is closed by the passage-opening/closing valve 52 in step S406, the depressurization of the measure passage 30 and the evaporation system 14 is forcibly terminated.

Figure 16:
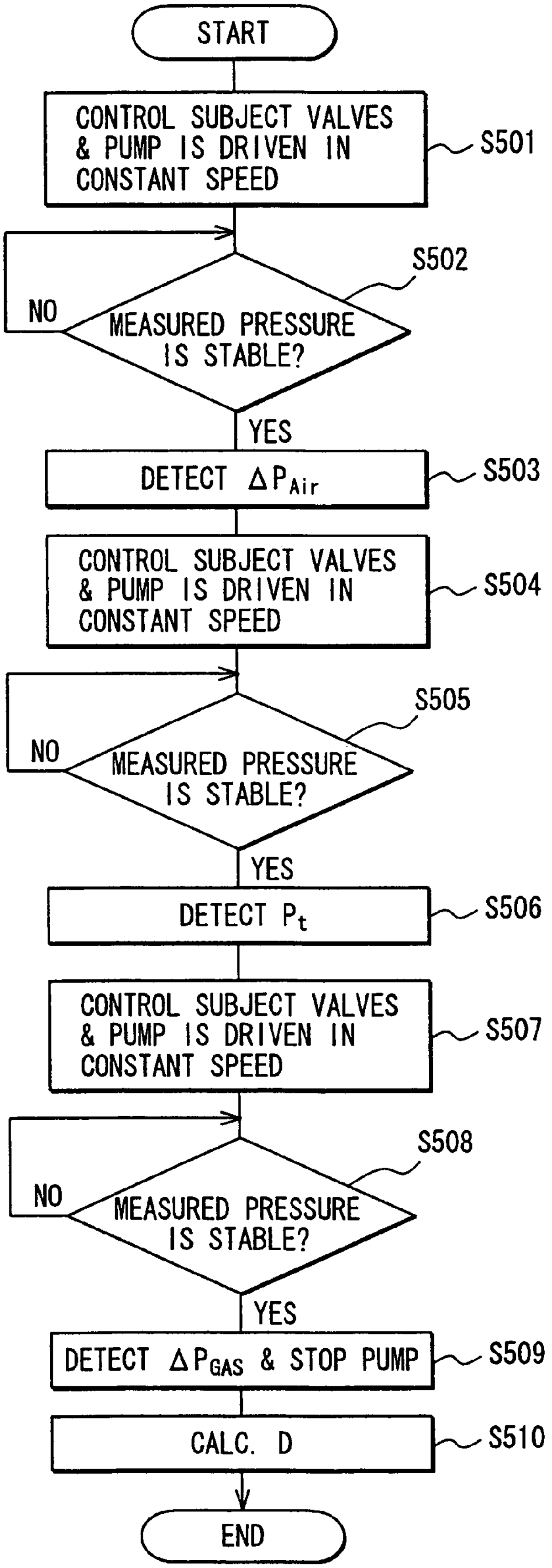
FIG. 16 is a flow chart for explaining the concentration measurement process.

Referring to FIG. 16, the concentration measuring process in step S305 is described hereinafter. During the concentration measuring process, the purge control valve 22 is closed as shown in (δ) to (ζ) of FIG. 13.

Figure 17:
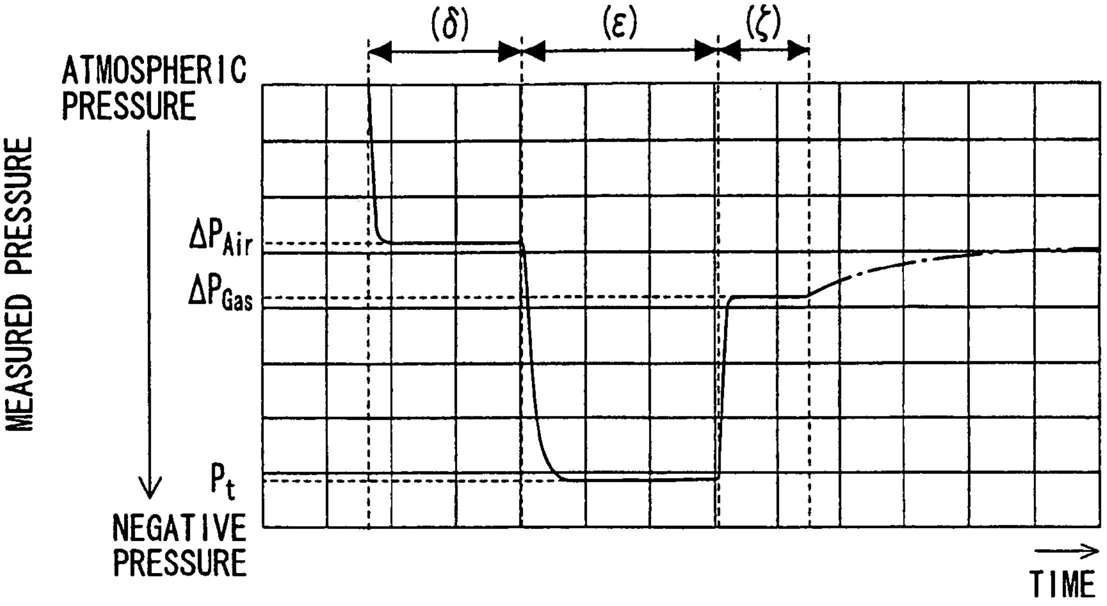
FIG. 17 is a characteristic diagram for explaining the concentration process.

In step S501, the control subject valves 52, 102, 106, and 112 are switched to positions shown in (δ) of FIG. 13, and the pump 32 is driven in a constant speed. As the result, the air flows in a way shown in FIG. 14, the measured pressure varies to a predetermined negative pressure shown in (δ) of FIG. 17. In step S502, the ECU 48 determines whether the measured pressure has become stable. When the answer is YES in step S502, the procedure proceeds to step S503 in which the measured pressure is stored in the memory as a differential pressure $\Delta P_{Air}$ of the air passing through the restrictor.

Figure 18:
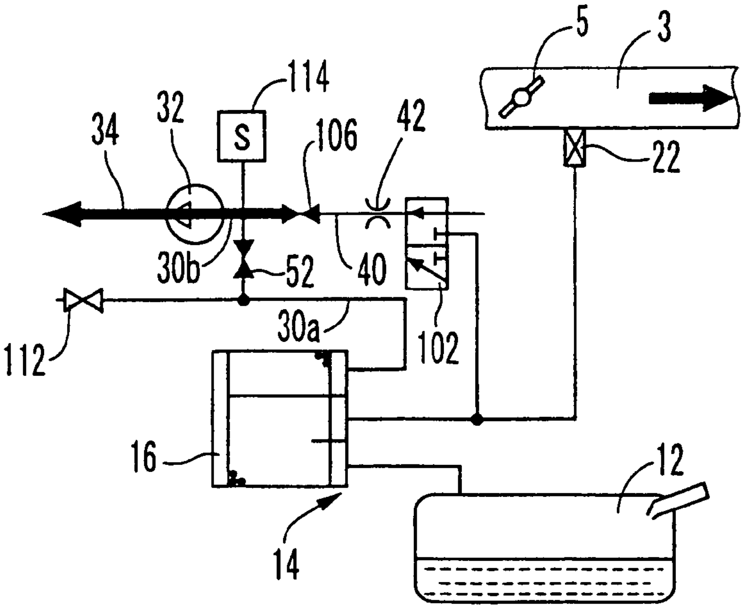
FIG. 18 is a schematic construction diagram for explaining the concentration measurement process.
Figure 19:
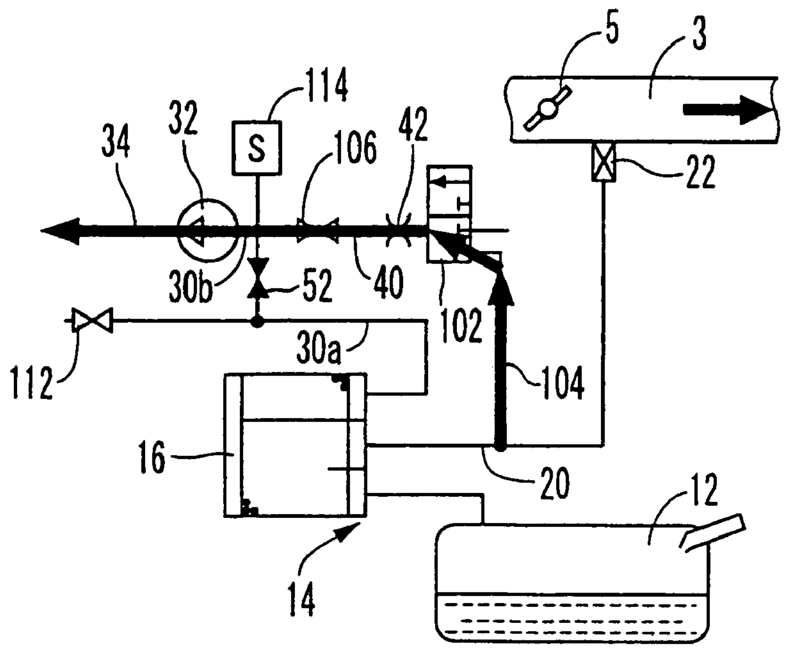
FIG. 19 is a schematic construction diagram for explaining the concentration measurement process.

In step S504, the control subject valves 52, 102, 106, and 112 are switched to positions shown in (ε) of FIG. 13, and the pump 32 is driven in a constant speed. Since the restrictor passage 40 is closed as shown in FIG. 18, the measured pressure varies to the shutoff pressure $P_t$ of the pump 32 as shown in (ε) of FIG. 17. In step S505, the ECU 48 determines whether the measured pressure has become stable. When the answer is YES, the procedure proceeds to step S506 in which the measure pressure is stored in the memory as the shutoff pressure $P_t$ of the pump 32.

In step S507, the control subject valves 52, 102, 106, and 112 are switched to positions shown in (ζ) of FIG. 13, and the pump 32 is driven in a constant speed. As the result, the air-fuel mixture in the purge passage 20 flows into the restrictor passage 40. The measured pressure varies toward the atmospheric pressure as shown in (ζ) of FIG. 17. When the air-fuel mixture has passed through the restrictor 42, the measured pressure becomes stable once according to the fuel vapor concentration D. However, when the air-fuel mixture is sucked into the pump 32, the measured pressure becomes unstable as shown by a dashed line in FIG. 17 and then the air-fuel mixture including the fuel vapor is discharged into the pump 32. In step S508, the ECU 48 determines whether the measured pressure has become stable. When the answer is YES, the procedure proceeds to step S509 in which the stable measured pressure is stored in the memory as the differential pressure $\Delta P_{Gas}$ of the air-fuel mixture passing through the restrictor. The pump 32 is stopped before the air-fuel mixture reaches the pump 32.

In step S510, the CPU reads the differential pressures $\Delta P_{Air}$ and $\Delta P_{Gas}$, the shutoff pressure $P_t$, and a concentration calculation equation (3) from the memory of the ECU 48. And then, the fuel vapor concentration D is calculated to be stored in the memory.

$$D=100\cdot\rho_{Air}\cdot\{1-\Delta P_{Gas}/\Delta P_{Air}\cdot(\Delta P_{Air}-P_t)^2/(\Delta P_{Gas}-P_t)^2\}/(\rho_{Air}-\rho_{HC}) \tag{3}$$

wherein $\rho_{Air}$ represents density of air, and $\rho_{Air}$ represents density of hydrocarbon (HC).

Figure 20:
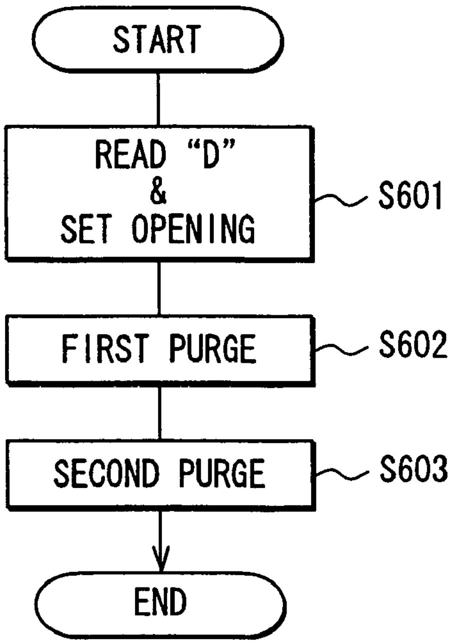
FIG. 20 is a flow chart for explaining a purge process.
Figure 21:
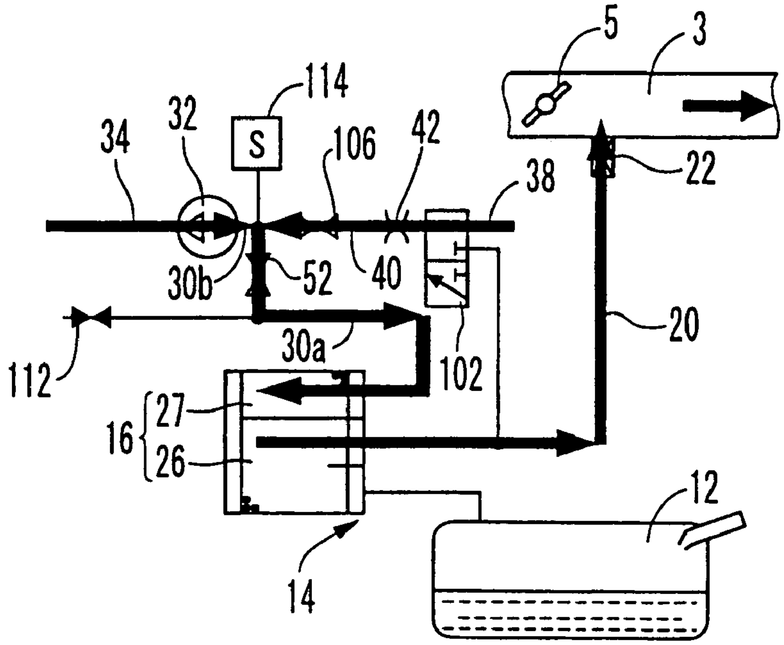
FIG. 21 is a schematic construction diagram for explaining the purge process.

Next, referring to FIG. 20, the flow of the purge process in step S307 will be described hereinafter.

In step S601, the CPU reads the fuel vapor concentration D from the memory. The ECU 48 sets an opening degree of the purge controlling valve 22 based on a condition of the vehicle and the fuel vapor concentration D. The opening degree of the purge controlling valve 22 is stored in the memory.

In step S602, each of valves 22, 52, 102, 106, and 112 is switched to a position shown in (η) of FIG. 13, and a first purge is conducted until a preset time has passed. During the first purge, since the negative pressure in the intake passage 3 is introduced into the canister 16, the fuel vapor is desorbed from the main adsorption part 26 and is purged into the intake passage 3. With this, since the negative pressure in the intake passage 3 is introduced into the measure passage 30 and the restrictor passage 40 through the canister 16, the air-fuel mixture remaining in the passages 30 and 40 is adsorbed in the subordinate adsorption part 27. In step S602, the CPU reads the opening degree of the purge controlling valve 22 stored in step S601 and adjusts the actual opening degree in such a manner as to agree with the stored value.

Figure 22:
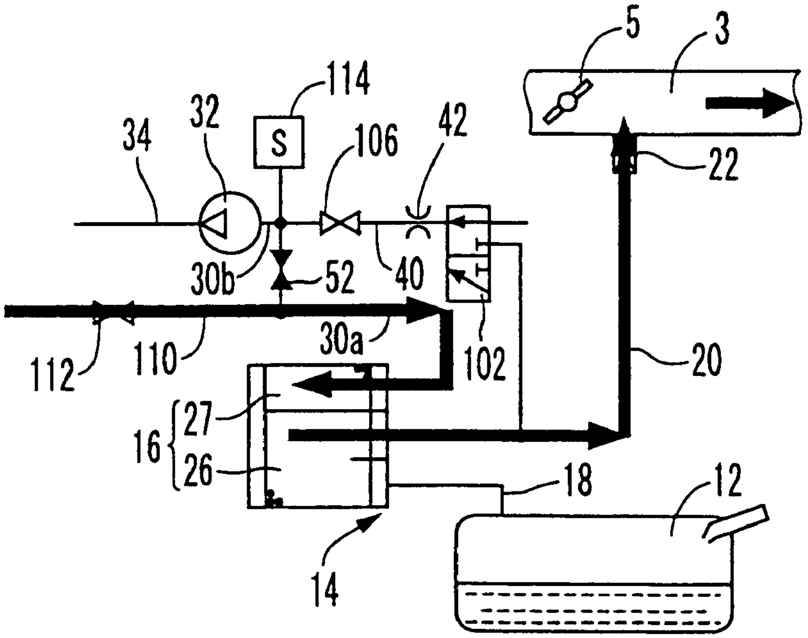
FIG. 22 is a schematic construction diagram for explaining the purge process.

In step S603, each of valves 22, 52, 102, 106, and 112 is switched to a position shown in (θ) of FIG. 13, and a second purge is conducted until a purge stop condition is established. During the second purge, since the negative pressure in the intake passage 3 is introduced into the canister 16, the fuel vapor is desorbed from the main adsorption part 26 and is purged into the intake passage 3 as shown in FIG. 22. In step S603 as well as in step S602, the opening degree of the purge controlling valve is controlled.

According to the third embodiment, when the blow-by of the fuel vapor from the canister to the measure passage 30 is detected during the leak detecting process, the pump 32 is stopped and the measure passage 30 is closed so that the depressurization of the measure passage 30 and the evaporation system 14 is forcibly terminated. Thus, the same effect as the first embodiment can be achieved. Furthermore, since the measure passage 30 is closed when the blow-by of the fuel vapor is arisen, the blow-by fuel vapor is restricted from flowing into the restrictor passage 40. Thus, in step S501 to step S503, the differential pressure $\Delta P_{Air}$ is accurately measured and a time for measuring the differential pressure can be shortened.

Besides, in the third embodiment, since the pressure sensor 114 detects the pressure in the leak detecting process and the pressure in a concentration measuring process, the production cost can be reduced.

(Modification)

In the first to third embodiments, the adsorptive agents 29 of the subordinate adsorption part 27 may be divided into multiple parts, whereby the time for fuel vapor to reach the main adsorption part 26 is increased.

Besides, the canister 16 may be comprised of single adsorption part, and the measure passage 30 may be connected with the case 24 at a side opposite to the introduction passage 18 and the purge passage 20. The filter 33, 56, 108 can be taken out.

In the second and third embodiment, the first atmosphere passage 34 and the second atmosphere passage 38 may be combined into one passage to reduce the number of the filter. In the third embodiment, the first to third atmosphere passages 34, 38, 110 may be combined into one passage to reduce the number of the filter.

In the first and third embodiment, the three-way valve 36, 102 can be replaced by two two-way valves. In the third embodiment, in a case that the three-way switching valve 102 is replaced by two two-way valves, both of the two-way valves are closed in step S504 to step S506, so that the opening/closing control valve 106 can be taken out. Furthermore, two two-way valves 52, 112 can be replaced by a three-way valve.

In the third embodiment, the pressure sensor 114 may be connected with the restrictor passage 40 through an additional branch passage in such a manner as to detect a differential pressure between both ends of the restrictor 42. Alternatively, two absolute pressure sensors may be provided to detect the pressure at both ends of the restrictor 42.

In the third embodiment, step S504 to step S506 may be performed before step S501 to step S503. In the first to third embodiments, it is not always necessary that the pump 32 is driven in a constant speed during the leak detecting process and the concentration measuring process.

What is claimed is:

1. A leak detecting apparatus comprising:

an evaporation system in which a fuel vapor evaporated in a fuel tank flows, the evaporation system including a canister for adsorbing the fuel vapor in such a way that the fuel vapor can be desorbed;

a measure passage;

a pump connecting with the canister through the measure passage;

a pressure sensor for measuring a pressure in the measure passage; and a detector for detecting a leak of the fuel vapor from the evaporation system toward an outside thereof based on the pressure measured by the pressure sensor while the pump depressurizes the evaporation system, wherein the detector determines that an adsorbed amount of the fuel is close to an upper limit of a canister adsorbing capacity and the fuel vapor is desorbed from the canister to the measure passage when the pressure measured by the pressure sensor is varied toward an atmospheric pressure.

2. A leak detecting apparatus according to claim 1, further comprising a passage valve for opening/closing the measure passage, wherein the detector controls the passage opening/closing valve in such a manner that the measure passage is closed when the discharge of the fuel vapor is detected.

3. A leak detecting apparatus according to claim 1, wherein the detector stops the pump when the discharge of the fuel vapor is detected.

4. A fuel vapor treatment apparatus comprising:

an evaporation system in which a fuel vapor evaporated in a fuel tank flows, the evaporation system including a canister for adsorbing the fuel vapor in such a way that the fuel vapor can be desorbed;

a measure passage;

a pump connecting with the canister through the measure passage;

a pressure sensor for measuring a pressure in the measure passage; and a detector for detecting a leak of the fuel vapor from the evaporation system toward an outside thereof based on the pressure measured by the pressure sensor while the pump depressurizes the evaporation system, wherein the detector determines that an adsorbed amount of the fuel is close to an upper limit of a canister adsorbing capacity and the fuel vapor is desorbed from the canister to the measure passage when the pressure measured by the pressure sensor is varied toward an atmospheric pressure, the evaporation system includes a purge passage for introducing the fuel vapor, which is desorbed from the canister, into an intake passage of an internal combustion engine, and a purge passage valve for opening/closing the purge passage, and the detector performs the leak detecting process while the purge passage valve closes the purge passage.

5. A fuel vapor treatment apparatus according to claim 4, further comprising:

a restrictor passage communicating with the measure passage and having a restrictor therein;

an atmosphere passage opened to an atmosphere;

a passage switch for switching a passage communicating with the restrictor passage between the purge passage and the atmosphere passage;

a pressure sensor for measuring a pressure between the pump and the restrictor while the pump depressurizing the restrictor passage; and a concentration calculator for calculating a concentration of the fuel vapor in the purge passage based on the pressure measured by the pressure sensor.

6. A fuel vapor treatment apparatus according to claim 5, wherein the passage switch switches the passage communicating with the restrictor passage between the purge passage and the atmosphere passage at a position opposite to the measure passage across the restrictor.

* * * * *